F. A. J. HOFFMANN.
EDUCATIONAL GAME.
APPLICATION FILED FEB. 12, 1914.
1,114,139.
Patented Oct. 20, 1914.
2 SHEETS—SHEET 1.
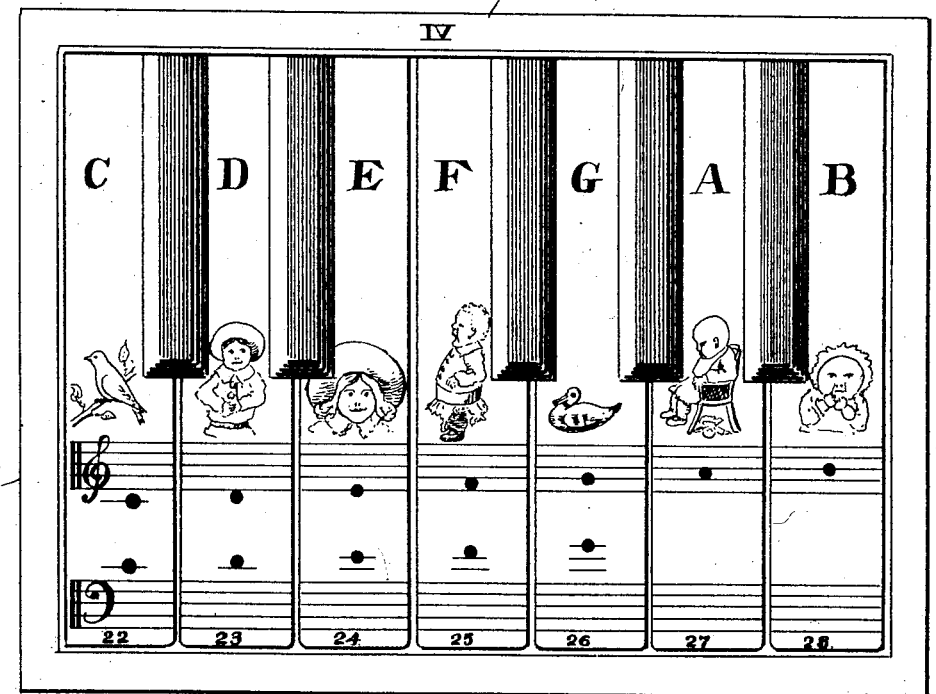
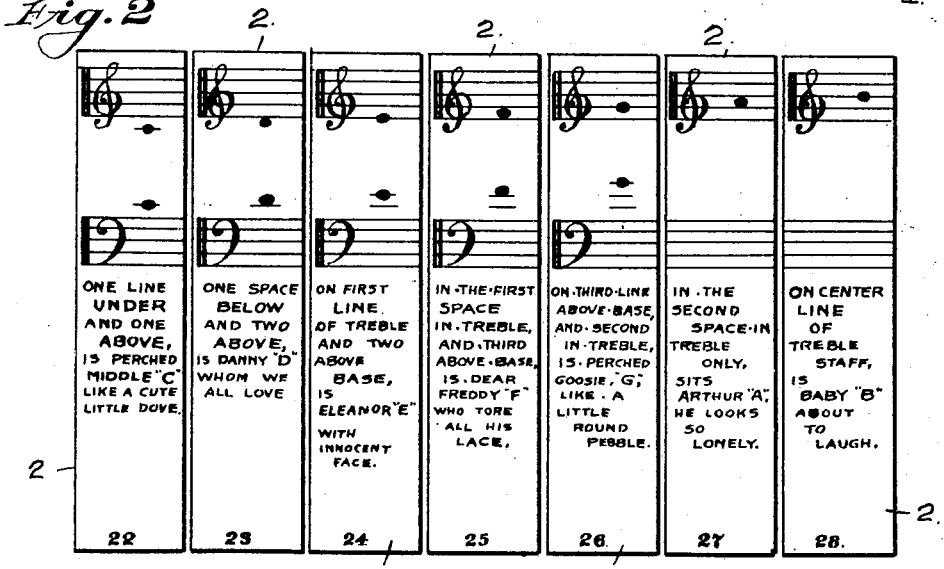
WITNESSES:
INVENTOR.
Frances A. J. Hoffmann
BY Arthur L. Slee.
HER ATTY.

F. A. J. HOFFMANN.
EDUCATIONAL GAME.
APPLICATION FILED FEB. 12, 1914.

1,114,139.

Patented Oct. 20, 1914.
2 SHEETS—SHEET 2.

Fig. 3.

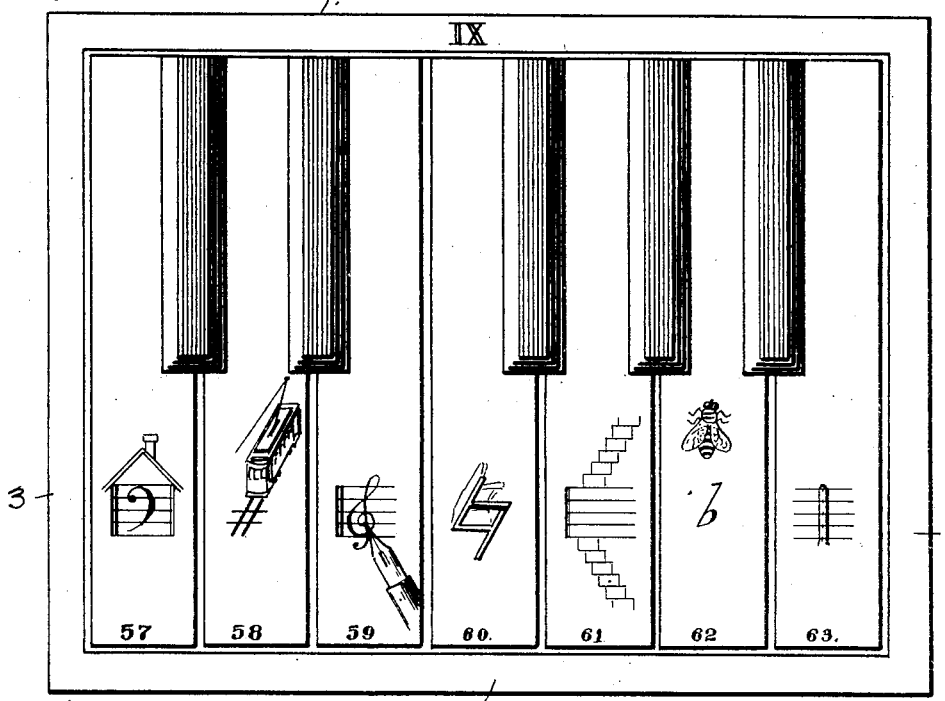

Fig. 4.

|  |  |  |  |  |  | 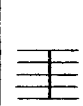 |
|---|---|---|---|---|---|---|
| THE·SIGN·OF BASE·CLEFF IN·A·HOUSE· PINES, AND·TURNS HIS·BACK ON·ALL·OF THE·LINES. | THE·SIGN·OF A·SHARP MAKES·HALF A·TONE HIGHER. AND·LOOKS LIKE·A· CROSSING FOR·TROLLEY CAR FLYER. | LIKE AN "S" TURNED AROUND, BEGIN·ON SECOND·LINE YOU·CAN· MAKE·A TREBLE "S" IF·YOUR PEN·IS· CLEAN AND FINE. | A·NATURAL LOOKS·LIKE A·CHAIR·WITH REAR·LEG GONE, AND·RETURN A·NOTE, TO·ITS NATURAL TONE | THE ⎯⎯ LEDGER·LINES ARE·SHORT AND·FINE, LIKE·STAIRS GOING·UP OR·DOWN IN·A·LINE. | HALF·A·TONE ·LOWER· GOES·WITH A·FLAT. IT·LOOKS·LIKE A "B" IT IS ROUND AN So FAT. | A·MEASURE ALWAYS WITH·A·BAR ENDS LIKE·A FENCE·POST FOR·MAKING PIG·PENS. |
| 57 | 58 | 59 | 60 | 61 | 62 | 63 |

WITNESSES:
Karl F. Oetsch.
Geo. Kromrey.

INVENTOR:
Frances A. J. Hoffmann.
BY Arthur L. Slee,
HER ATTY.

UNITED STATES PATENT OFFICE.

FRANCES A. J. HOFFMANN, OF SAN FRANCISCO, CALIFORNIA.

EDUCATIONAL GAME.

1,114,139.     Specification of Letters Patent.     Patented Oct. 20, 1914.

Application filed February 12, 1914. Serial No. 819,099.

*To all whom it may concern:*

Be it known that I, FRANCES A. J. HOFFMANN, a subject of the Emperor of Germany, and residing in the city and county of San Francisco and State of California, have invented a new and useful Improvement in Educational Games, of which the following is a specification.

My invention relates to games wherein a series of cards each has a pictorial representation of one octave of the piano keyboard and a second series of cards each representing one of the keys of a piano and having representations thereon characteristic of the particular piano key which it represents, and the objects of my invention are first, to provide a game for the amusement of children; second, to provide an educational game for children; third, to provide a game for children which is adapted to facilitate the reading of the notes and the various signs used in writing and reading music; and fourth, to provide an educational game for children which shall teach the location on a piano of every note and the value of every sign which may be indicated in written music. I accomplish these several features by means of the device disclosed in the drawings forming a part of the present specification wherein like characters of reference designate similar parts throughout the said specification and drawings, and in which—

Figure 1 is a representation of one of the cards representing one octave on the keyboard of a piano. Fig. 2 discloses a series of cards each one indicating one of the keys disclosed on the octave represented on the card shown in Fig. 1. Fig. 3 is a representation of one of the other octave cards of the series whereon various signs used in music are depicted. Fig. 4 discloses a series of cards each one indicating one of the signs represented on the card shown in Fig. 3.

The game is played with nine or more octave cards, each of which represents one octave or seven keys on the piano. For each key represented on the nine cards, there is a small card which represents or indicates that particular key only. Seven of the octave cards represent the seven octaves of an ordinary piano keyboard, with its sharps and flats, or black notes.

Referring to the drawings, the numeral 1 is used to designate an octave card, number IV of the series, which represents the middle octave on the piano keyboard. A treble and a base clef are drawn across all of the seven keys of each octave card and on the staff thus drawn, is properly located the note which represents in written music that particular key. Each key has also a separate picture thereon, the purpose of which will hereinafter be more fully described.

A series of note cards 2, of substantially the same dimensions as one of the keys on the octave cards, have the treble and base clefs indicated thereon and on each card is indicated on the clef, a note which corresponds with or indicates one of the keys represented on one of the octave cards. Each of the note cards has printed thereon a small verse which characterizes some prominent feature of that particular piano key as well as the written note which it represents. For instance, the key middle "C" on the octave cards one has a picture of a dove thereon while the verse on the card 2 which represents middle "C" indicates the location of the written note on the bass and treble clefs by its reference to "one line under" for the treble clef, and "and one above" for the bass clef, as well as a reference to the "dove" which is depicted on the key representing middle "C" on the octave card 1.

Each key represented on each of the seven octave cards has a different picture thereon. Each key on each of the seven ovtave cards also has indicated on the lines of the staff, the location of the written note indicating that particular key.

There being nine octave cards and seven of them having been used for the seven octaves of the piano keys, the remaining two octave cards are used to represent the signatures, bars, rests and other signs used in written music, as indicated or shown by the octave card 3 in Fig. 3 of the drawings. Each sign is depicted on a separate key on the octave cards 3 and a series of sign cards 4, similar to the note cards 2, have signs and verses setting forth by inference some characteristic of the picture of that sign on the octave cards 3. For instance, the first card in Fig. 4 represents the signature of the bass clef which is a "C" reversed. The verse on that card familiarizes the player with the appearance of the signature and also, by inference, the fact that it is reversed or "turns his back on all of the lines". The verse also refers to the house which is represented, with the signature therein, on the first key on the octave card and in this manner the sign card having the base clef signature thereon may be easily associated with the key showing the bass clef signature imprisoned in the house, in the same manner that the card 2, having middle "C" written thereon, with its reference to the dove, immediately associates the note card indicating middle "C" with the proper location of the key middle "C" on the keyboard, represented by the "C" key on the octave card 1.

While it is intended that a note card 2 shall represent a particular key depicted on the octave card 1, it is not absolutely essential that a sign card 4 shall represent a particular key on the octave card 3, but rather a particular sign on any key of the said octave card 3.

In order to enable very young beginners to more readily associate a note card 2 or a sign card 4 with its particular note or sign on the proper octave card 1 or 3, I have numbered the keys on the octave cards from 1 to 63 and the note and sign cards 2 and 4 are numbered similarly to the key to which they belong. Similarly, the octave cards are numbered at the top thereof with Roman or other suitable numerals from I to IX.

The game is to be played, and the players to be instructed to proceed as follows: The octave cards are spread out in regular order to represent the whole keyboard of a piano with the octave cards 3 representing the signs, at either end, preferably the right end. A dealer shuffles the note and sign cards 2 and 4, and selects one at random. The dealer reads the first portion of the verse on the selected note or sign card and the player who first identifies the note or sign which it represents, receives a marker or other suitable token and scores one. The card is then handed to the player who first identifies the same and he or she is allowed to place it on the proper key on the octave card. If it is placed correctly he or she receives another marker and scores two. If the player places the note or sign card on the wrong key they do not make a second score but another player who first detects the mistake receives a marker instead. The player holding the greatest number of markers or tokens when all of the note cards and sign cards have been placed on their proper keys on the octave cards wins the game.

The rules may be modified to any extent to fit the game.

It is obvious that the verses and pictures may be modified also. The only requirement as to the verses and pictures is that they shall associate the note or sign cards with the key on the octave cards on which they belong. Also the verses must indicate some characteristic of the note, sign or key which they represent. Therefore, I do not wish to confine myself to the precise pictures and verses shown in the drawings.

Having thus described my invention what I claim as new and desire to secure by Letters Patent is—

1. An educational game comprising a series of cards, each representing an octave on the keyboard of a piano; and a second series of cards each one representing one key only on one of the first series of cards.

2. An educational game comprising a series of cards, each representing an octave on the keyboard of a piano and each key having a different picture thereon; and a second series of cards each one of which represents one key only on the first series.

3. An educational game comprising a series of cards, each representing an octave on the keyboard of a piano, each key of the said keys having a picture thereon; and a second series of cards, each one of which has printed thereon a portion of a treble and a bass clef, and a note printed in the clef to represent one only of the keys represented in the first series of cards.

4. An educational game comprising a series of cards, each card representing a different octave on the keyboard of a piano, each key having a different picture thereon; and a second series of cards having a portion of a base and treble clef and a note printed thereon representing one only of one of the piano keys represented on the first series of cards.

5. An educational game comprising a series of cards, each card representing an octave on the keyboard of a piano, and each key having thereon a different picture and the note in written music representing that particular key; and a second series of cards each one of which has a note in written music thereon representing one only of the keys represented in the first series of cards and a suitable verse indicating a characteristic of that note and a reference to the picture on the key corresponding to that card.

6. An educational game comprising a series of cards, each card representing an octave on the keyboard of a piano and each key having a different picture and the letter and note by which the said key is known, printed thereon; a second series of cards, each one of which has a different note thereon representing one only of the keys represented in the first series of cards and a verse thereon indicating a characteristic of the note and of the picture on that key which the said card represents.

7. An educational game comprising a series of cards, each card representing an octave on the keyboard of a piano, some of the octaves so represented having a different picture on each key therein and a note on that key by which the said key is known, the remaining octaves having on each key a sign used in writing music; and a second series of cards, some of which have thereon a note representing one only of the keys represented in the first series of cards, the remaining cards of the second series having thereon a sign used in music and corresponding to the signs on the keys represented in the first series, each of the cards of the second series having a suitable verse thereon indicating a characteristic of the note and key, or sign represented by that card.

In witness whereof I hereunto set my signature in the presence of two subscribing witnesses.

FRANCES A. J. HOFFMANN.

Witnesses:
   JAMES F. McCUE,
   KARL F. SCHULTZ.